US012589291B2

(12) United States Patent
Wang

(10) Patent No.: US 12,589,291 B2
(45) Date of Patent: Mar. 31, 2026

(54) METHOD FOR PROCESSING INFORMATION AND TERMINAL DEVICE AND NON-TRANSITORY COMPUTER-READABLE STORAGE MEDIUM

(71) Applicant: NETEASE (HANGZHOU) NETWORK CO., LTD., Hangzhou (CN)

(72) Inventor: Ziyi Wang, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 179 days.

(21) Appl. No.: 18/257,102

(22) PCT Filed: Feb. 24, 2022

(86) PCT No.: PCT/CN2022/077593
§ 371 (c)(1),
(2) Date: Jun. 13, 2023

(87) PCT Pub. No.: WO2022/237275
PCT Pub. Date: Nov. 17, 2022

(65) Prior Publication Data
US 2024/0100416 A1      Mar. 28, 2024

(30) Foreign Application Priority Data

May 13, 2021    (CN) .......................... 202110525095.9

(51) Int. Cl.
*A63F 13/25*        (2014.01)
*A63F 13/426*       (2014.01)
*A63F 13/56*        (2014.01)

(52) U.S. Cl.
CPC ............ *A63F 13/25* (2014.09); *A63F 13/426* (2014.09); *A63F 13/56* (2014.09)

(58) Field of Classification Search
CPC ......... A63F 13/25; A63F 13/426; A63F 13/56
See application file for complete search history.

(56) References Cited

U.S. PATENT DOCUMENTS

2010/0285876 A1    11/2010  Takahashi et al.
2019/0076739 A1     3/2019  Ge
(Continued)

FOREIGN PATENT DOCUMENTS

CN        107694086 A      2/2018
CN        107715454 A      2/2018
(Continued)

OTHER PUBLICATIONS

Notice of Allowance dated Oct. 31, 2023 for Japanese Application No. 2022-566721.
(Continued)

*Primary Examiner* — Yingchuan Zhang
(74) *Attorney, Agent, or Firm* — Qinghong Xu

(57)        ABSTRACT

A method for processing information includes: displaying at least one prompt mark through a graphical user interface, the graphical user interface including a first game view screen, the first game view screen at least partially including a game scene and at least partially including a first virtual object, the prompt mark being a mark generated according to a marking operation of a second virtual object in a same game round as the first virtual object in the game scene; determining a target prompt mark in the at least one prompt mark according to a selection instruction; displaying a first function control corresponding to the target prompt mark through the graphical user interface; and in response to a first trigger operation for the first function control, adjusting a display
(Continued)

parameter of the target prompt mark in the graphical user interface and displaying the target prompt mark according to the display parameter.

20 Claims, 9 Drawing Sheets

(56) References Cited

U.S. PATENT DOCUMENTS

| | | | |
|---|---|---|---|
| 2020/0155930 | A1 | 5/2020 | Wang |
| 2020/0348387 | A1 | 11/2020 | You et al. |

FOREIGN PATENT DOCUMENTS

| | | | |
|---|---|---|---|
| CN | 108196765 | A | 6/2018 |
| CN | 110115838 | A | 8/2019 |
| CN | 110738738 | A | 1/2020 |
| CN | 111097171 | A | 5/2020 |
| CN | 111359208 | A | 7/2020 |
| CN | 111773705 | A | 10/2020 |
| CN | 111991800 | A | 11/2020 |
| CN | 112402962 | A | 2/2021 |
| CN | 112402977 | A | 2/2021 |
| CN | 112691375 | A | 4/2021 |
| CN | 112717392 | A | 4/2021 |
| CN | 113244603 | A | 8/2021 |
| CN | 118593987 | A | 9/2024 |
| JP | 2000140417 | A | 5/2000 |
| JP | 2014188296 | A | 10/2014 |
| JP | 2019058659 | A | 4/2019 |
| WO | 2019228030 | A1 | 12/2019 |
| WO | 2020134059 | A1 | 7/2020 |
| WO | 2020238592 | A1 | 12/2020 |

OTHER PUBLICATIONS

1st Office Action dated Nov. 15, 2023 for Chinese Patent No. 202110525095.9.
International Search Report dated May 24, 2022 of International Application No. PCT/CN2022/077593.
1st Office Action dated Apr. 9, 2025 of Chinese Application No. 2024105793164.
1st Office Action dated Apr. 11, 2025 of Chinese Application No. 2024105793569.
Notice of Allowance dated Jun. 25, 2025 of Chinese Application No. 2024105793569.

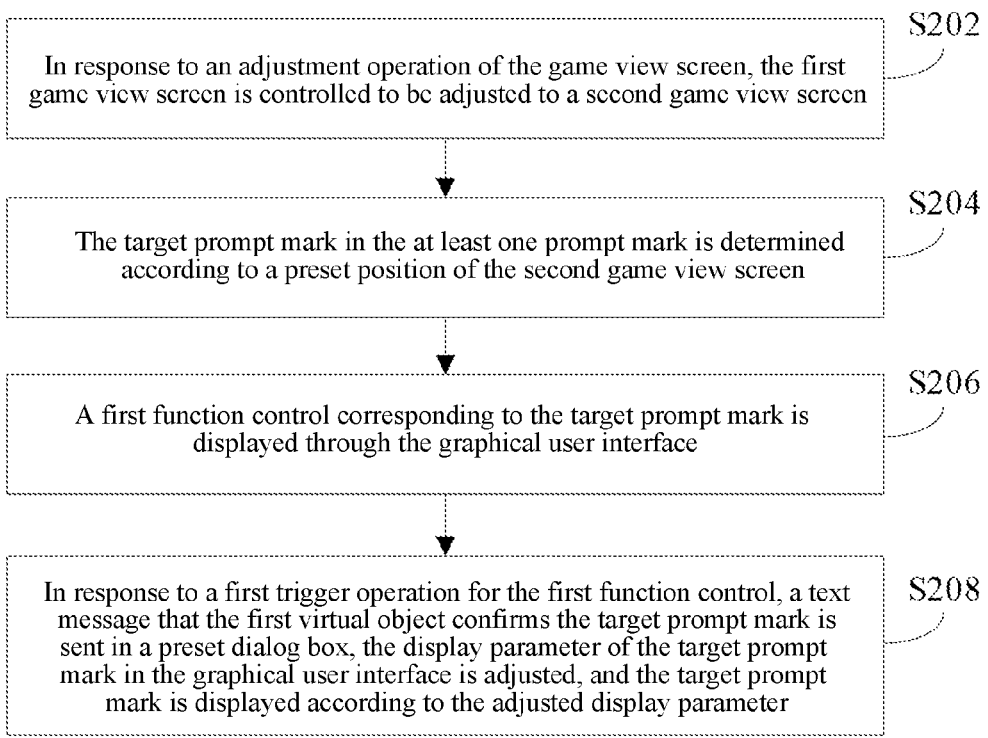

In response to an adjustment operation of the game view screen, the first game view screen is controlled to be adjusted to a second game view screen                S202

The target prompt mark in the at least one prompt mark is determined according to a preset position of the second game view screen                S204

A first function control corresponding to the target prompt mark is displayed through the graphical user interface                S206

In response to a first trigger operation for the first function control, a text message that the first virtual object confirms the target prompt mark is sent in a preset dialog box, the display parameter of the target prompt mark in the graphical user interface is adjusted, and the target prompt mark is displayed according to the adjusted display parameter                S208

FIG.2

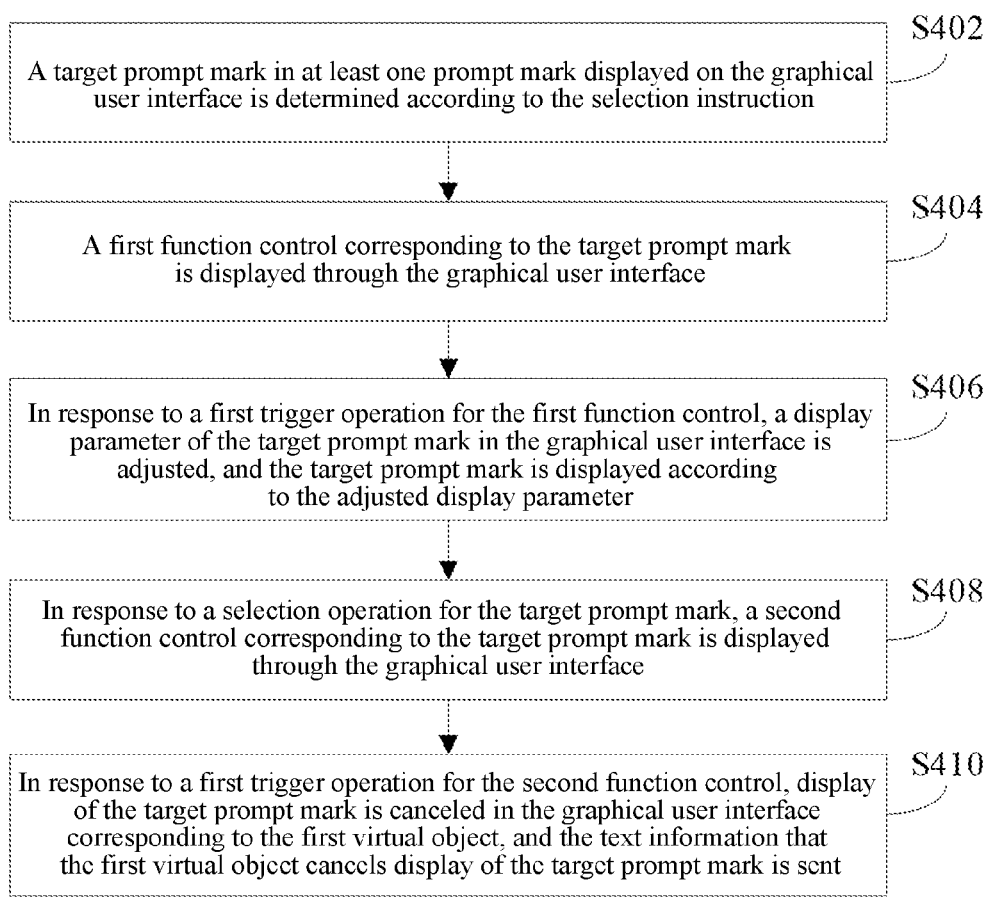

A target prompt mark in at least one prompt mark displayed on the graphical user interface is determined according to the selection instruction — S402

A first function control corresponding to the target prompt mark is displayed through the graphical user interface — S404

In response to a first trigger operation for the first function control, a display parameter of the target prompt mark in the graphical user interface is adjusted, and the target prompt mark is displayed according to the adjusted display parameter — S406

In response to a selection operation for the target prompt mark, a second function control corresponding to the target prompt mark is displayed through the graphical user interface — S408

In response to a first trigger operation for the second function control, display of the target prompt mark is canceled in the graphical user interface corresponding to the first virtual object, and the text information that the first virtual object cancels display of the target prompt mark is sent — S410

FIG.4

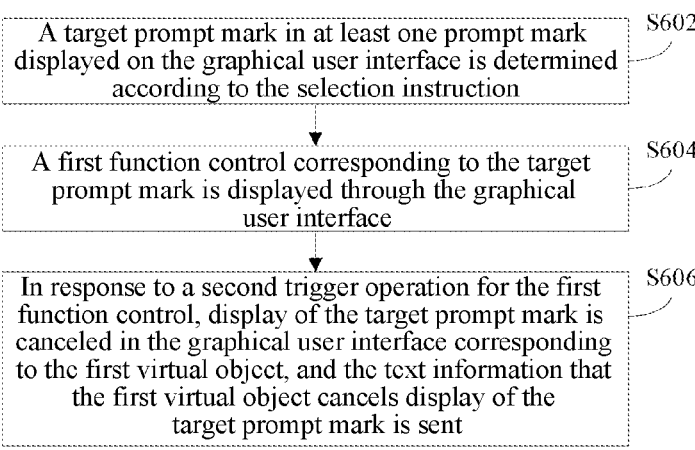

A target prompt mark in at least one prompt mark displayed on the graphical user interface is determined according to the selection instruction — S602

A first function control corresponding to the target prompt mark is displayed through the graphical user interface — S604

In response to a second trigger operation for the first function control, display of the target prompt mark is canceled in the graphical user interface corresponding to the first virtual object, and the text information that the first virtual object cancels display of the target prompt mark is sent — S606

FIG.6

METHOD FOR PROCESSING INFORMATION AND TERMINAL DEVICE AND NON-TRANSITORY COMPUTER-READABLE STORAGE MEDIUM

CROSS REFERENCE

The present disclosure is a U.S. National Stage Application of International Application No. PCT/CN2022/077593, filed on Feb. 24, 2022, which is based upon and claims priority to Chinese Patent Application No. 202110525095.9, entitled "Method and apparatus for processing information, and terminal device", filed on May 13, 2021, the entire contents of both of which are incorporated herein by reference for all purposes.

TECHNICAL FIELD

The present disclosure relates to the technical field of game interaction, and in particular, to a method and apparatus for processing information, a non-transitory computer-readable storage medium and a terminal device.

BACKGROUND

In the related art, a game player can mark a virtual scene, a virtual material, an airdrop, a virtual vehicle, a box and the like, and synchronize a mark point and mark information to a teammate, so that the mark point marked by the player is displayed in the game scene of the teammate.

It should be noted that the information disclosed in the above background part is only used to enhance the understanding of the background of the present disclosure, and therefore may include information that does not constitute the related art known to those of ordinary skills in the art.

SUMMARY

According to a first aspect, the present disclosure provides a method for processing information, the method includes: displaying, by a terminal device including a graphical user interface, at least one prompt mark through the graphical user interface, where the graphical user interface includes a first game view screen, the first game view screen at least partially includes a game scene and at least partially includes a first virtual object, and the prompt mark is a mark generated according to a marking operation of a second virtual object in a same game round as the first virtual object in the game scene; determining a target prompt mark in the at least one prompt mark according to a selection instruction; displaying a first function control corresponding to the target prompt mark through the graphical user interface; and in response to a first trigger operation for the first function control, adjusting a display parameter of the target prompt mark in the graphical user interface and displaying the target prompt mark according to the display parameter.

According to a second aspect, the present disclosure provides a terminal device, the terminal device includes a processor and a memory, the memory stores with a machine-executable instruction able to be executed by the processor, and the processor executes the machine-executable instruction to implement the method for processing information according to the above aspect.

According to a third aspect, the present disclosure provides a non-transitory computer-readable storage medium, the computer-readable storage medium stores with a computer-executable instruction, and when the computer-executable instruction is invoked and executed by a processor, the computer-executable instruction causes the processor to implement the method for processing information according to the above aspect.

Other features and advantages of the present disclosure will be explained in the following description, or some of the features and advantages may be inferred or unambiguously determined from the description, or may be obtained by implementing the above-mentioned techniques of the present disclosure.

In order to make the above objects, features, and advantages of the present disclosure more comprehensible, the preferred embodiments are listed in the following and described in conjunction with the accompanying drawings in detail as follows.

It should be understood that the above general description and the following detailed description are exemplary and explanatory only and are not intended to limit the present disclosure.

BRIEF DESCRIPTION OF THE DRAWINGS

In order to illustrate the specific embodiments of the present disclosure or the technical solutions in the related art more clearly, the accompanying drawings required to be used in description of the specific embodiments or the related art are briefly described below. It is obvious that the accompanying drawings described below are some embodiments of the present disclosure, and for those of ordinary skills in the art, other drawings may be obtained according to these accompanying drawings without creative efforts.

FIG. 2 is a flowchart of another method for processing information according to an embodiment of the present disclosure;

FIG. 4 is a flowchart of another method for processing information according to an embodiment of the present disclosure;

FIG. 6 is a flowchart of another method for processing information according to an embodiment of the present disclosure;

DETAILED DESCRIPTION

Figure 1:
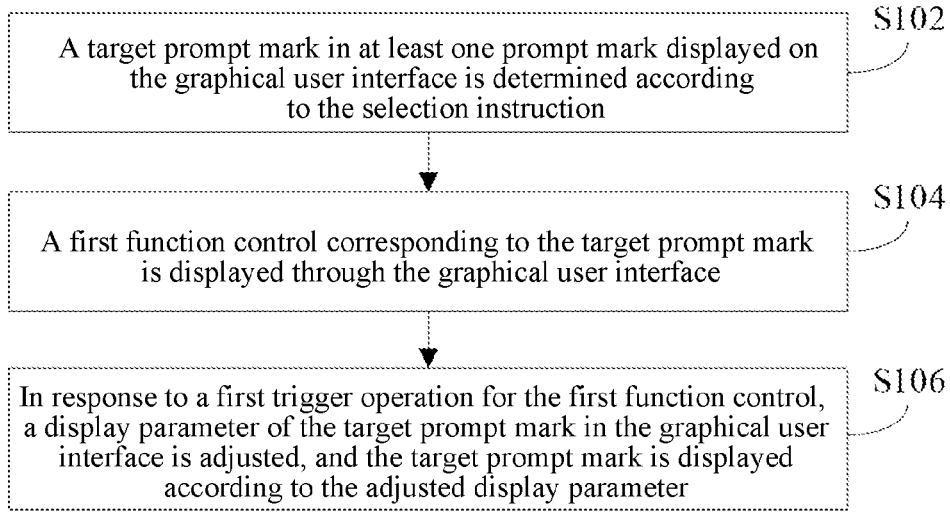
FIG. 1 is a flowchart of a method for processing information according to an embodiment of the present disclosure.

In order to make the objectives, technical solutions and advantages of the embodiments of the present disclosure clearer, the technical solutions in the embodiments of the present disclosure will be clearly and completely described below with reference to the accompanying drawings. Obviously, the described embodiments are part embodiments of the present disclosure, rather than all embodiments of the present disclosure. Generally, the components of the embodiments of the present disclosure, which are described and illustrated here in the accompanying drawings, may be arranged and designed in a variety of different configurations.

Therefore, the following detailed description of embodiments of the disclosure provided in the accompanying drawings is not intended to limit the scope of the present disclosure that is claimed, but merely represents selected embodiments of the present disclosure. All other embodiments obtained by those of ordinary skills in the art based on the embodiments of the present disclosure without creative efforts fall within the protection scope of the present disclosure.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

First, the terms involved in the present disclosure are introduced.

(1) Virtual Scene (Game Scene)

A virtual scene is a virtual scene displayed (or provided) when an application runs on a terminal or server. Optionally, the virtual scene is a simulation environment of a real world, or a semi simulated and semi fictional virtual environment, or a purely fictional virtual environment. The virtual scene is any one of a two-dimensional virtual scene and a three-dimensional virtual scene, and the virtual environment may be sky, land, ocean, etc., where the land includes an environmental element such as desert and city. Among them, the virtual scene is a scene in which a virtual object controlled by a user completes the game logic.

(2) Virtual Object

A virtual object refers to a dynamic object that can be controlled in a virtual scene. In some embodiments, the dynamic object may be a virtual character, a virtual animal, a cartoon character, and the like. The virtual object is a role controlled by the player through an input device, or is an artificial intelligence (AI) provided in a battle of a virtual environment by training, or a non-player character (NPC) provided in the battle of the virtual scene. In some embodiments, the virtual object is a virtual character performing competition in the virtual scene. In some embodiments, the number of virtual objects in the battle of the virtual scene is preset, or is dynamically determined according to the number of clients that join in the battle, which is not limited in the embodiments of the present disclosure. In some embodiments, a user can control the virtual object to move in the virtual scene, for example, can control the virtual object to run, jump, crawl, etc., and can also control the virtual object to battle with other virtual objects using skills, virtual props, and the like provided by the application program.

(3) Game Interface

The game interface refers to an interface corresponding to an application program provided or displayed through a graphical user interface, and the interface includes a UI interface and a game screen for the player to interact. In some embodiments, the UI interface may include a game control (for example, a skill control, a movement control, a function control, etc.), an indication identification (for example, a direction indication identification, a character indication identification, etc.), an information display region (for example, a number of attacks and competition time, etc.), or a game setting control (for example, a system setting, a shop, a gold coin, etc.). In some embodiments, the game screen is a display screen corresponding to the virtual scene displayed by the terminal device, and the game screen may include virtual objects such as a game character, an NPC character, an AI character and the like that perform the game logic in the virtual scene.

In the related art, the game player may mark the virtual scene, the virtual material, the airdrop, the virtual vehicle, the box, and the like in the game interface, and synchronize the mark point and the mark information to a teammate, so that the mark point marked by the player is displayed in the game scene of the teammate. However, the teammate maybe cannot perform operation control on these mark points, thereby affecting game scores and gaming experience.

The embodiments of the present disclosure provide a method and apparatus for processing information, and a terminal device. The technology can be applied to scenes of processing mark information in various group battle games.

In an embodiment of the present disclosure, the method for processing information may run on a terminal device or a server. Among them, the terminal device may be a local terminal device. When the method for processing information runs on the server, the method may be implemented and executed based on a cloud interaction system, where the cloud interaction system includes a server and a client device.

In some embodiments, various cloud applications may be run under a cloud interaction system, for example, a cloud game. Taking a cloud game as an example, the cloud game refers to a game mode based on cloud computing. In the running mode of the cloud game, the running body of the game program and the presentation body of the game screen are separated, the storage and running of the method for processing information are completed on a cloud game server, and the function of a client device is to receive and send data, as well as present the game screen. For example, the client device may be a display device having a data transmission function close to the user side, such as a mobile terminal, a television, a computer, a palm computer, etc. However, the terminal device performing information processing is the cloud game server on the cloud. When a game is performed, the player operates the client device to send an operation instruction to the cloud game server, the cloud game server runs the game according to the operation instruction, encodes and compresses the data such as the game screen, returns it to the client device through the network, and finally performs decoding and outputs the game screen through the client device.

In some embodiments, the terminal device may be a local terminal device. Taking a game as an example, the local terminal device stores with a game program and is configured to present a game screen. The local terminal device is configured to interact with the player through a graphical user interface, that is, to conventionally download and install the game program and run it through an electronic device. The manners in which the local terminal device provides the graphical user interface to the player may include a variety of manners, for example, it may be rendered and displayed on a display screen of the terminal, or provided to the player by holographic projection. For example, the local terminal device may include a display screen and a processor, the display screen is configured to present the graphical user interface, the graphical user interface includes a game screen, and the processor is configured to run the game, generate the graphical user interface, and control display of the graphical user interface on the display screen.

In some embodiments, an embodiment of the present disclosure provides a method for processing information, and a graphical user interface is provided through a terminal device. Among them, the terminal device may be the fore-going local terminal device, or may be a client device in the foregoing cloud interaction system. A graphical user interface is provided through the terminal device, and the graphical user interface includes a first game view screen, where the first game view screen at least partially includes a game scene and at least partially includes a first virtual object.

The first game view screen presented by the graphical user interface may include the entire game scene, or may include a local portion of the game scene. For example, when the game scene is relatively larger, local portion content of the game scene may be displayed on the first game view screen of the terminal device during the game, and the game scene may include ground, mountain, stone, flower, grass, tree, building, etc.

The first game view screen presented by the graphical user interface may include the entire first virtual object, or may include a local portion of the first virtual object. For example, in a game from a third person's perspective, the first game view screen may include the entire virtual object; and in a game from a first person's perspective, the first game view screen may include a portion or local portion of the virtual object. In addition to at least part of the first virtual object, the first game view screen may further include a local portion or entire of the virtual object other than the first virtual object, and the virtual object may be a teammate of the first virtual object or an enemy of the first virtual object.

In some embodiments, the first game view screen includes a mini map (i.e., a thumbnail map). The mini map may be a thumbnail of the entire game scene, or may be a thumbnail of local portion of the game scene. For different types of games, different details may be displayed in the mini map, for example, which may be used to assist the player in determining the map details of their location in the game world, the real-time location of the teammate, the real-time location of the enemy, the current game scene view information, etc. The mini map may be displayed on the upper left, upper right or other location in the graphical user interface, which is not specifically limited here.

At least one prompt mark is displayed through the graphical user interface, where the prompt mark is a mark generated according to a marking operation of a second virtual object in a same game round as the first virtual object in the game scene. The prompt mark may be a mark of a specific scene, a virtual material, an airdrop, a virtual vehicle, a virtual accessory, or a box in the game scene, or may be a mark of an enemy belonging to a different camp relative to the second virtual object, and the prompt mark may play a function of prompting for the virtual object in a same game round.

As shown in FIG. 1, the above method for processing information specifically includes the following content.

In step S102, a target prompt mark in at least one prompt mark displayed on the graphical user interface is determined according to the selection instruction.

In some embodiments, one or more prompt marks are displayed in the graphical user interface, and the prompt marks displayed here may be marked by a different virtual object in the same game round as the first virtual object, or may be marked by a certain virtual object in the same game round as the first virtual object. The selection instruction may be an instruction that the player corresponding to the first virtual object selects a certain prompt mark displayed in the graphical user interface, and the selected prompt mark is the target prompt mark. The selection instruction may be that a preset position of a game view screen in the graphical user interface (which may be set according to research and development requirements) aims at a certain prompt mark, or may be that the preset position directs to a specific region corresponding to a certain prompt mark, etc.

In step S104, a first function control corresponding to the target prompt mark is displayed through the graphical user interface.

When the target prompt mark is determined, the first function control corresponding to the target prompt mark may be displayed through the graphical user interface, and the display position of the first function control in the graphical user interface may be set according to the research and development requirements. For example, the first function control can be displayed on the upper left or the upper right of the graphical user interface, and can also be displayed in a region near the target prompt mark. The first function control is used by the player to provide feedback on the target prompt mark, so that the terminal device performs corresponding processes on the target prompt mark according to feedback information.

In step S106, in response to a first trigger operation for the first function control, a display parameter of the target prompt mark in the graphical user interface is adjusted, and the target prompt mark is displayed according to the adjusted display parameter.

The first trigger operation for the first function control may be a click operation or a sliding operation or the like for the first function control, or may be a click operation or a sliding operation or the like for a specified region of the first function control. The display parameter may refer to a display form of the target prompt mark in the graphical user interface, and the display parameter includes: a display duration and/or a display style; that is, the display parameter may include only a display duration, or may include only a display style, or may include both a display duration and a display style. Among them, the specific duration of the display duration may be set according to research and development requirements (for example, 30 seconds or 2 minutes, etc.). The display duration is usually longer than a display duration when the first function control is not triggered, and it can also be understood as that when the player triggers the first function control corresponding to the target prompt mark, the display time of the target prompt mark is prolonged, so that the player can be better reminded.

The display style includes a display color and/or a display size, that is, the display style may only include a display color, or may include only a display size, or may include both a display style and a display size. The specific expression form of the display color and the display size can be set according to research and development requirements, for example, the color of the mark can be deepened, the size of the mark can be increased, etc., so that the mark can be displayed more clearly.

According to the method for processing information provided in the embodiments of the present disclosure, firstly, at least one prompt mark is displayed through a graphical user interface, the prompt mark is a mark generated according to a marking operation of a second virtual object in a same game round as the first virtual object in the game scene; then, a target prompt mark in the at least one prompt mark is determined according to a selection instruction; a first function control corresponding to the target prompt mark is further displayed through the graphical user interface; and then, in response to a first trigger operation for the first function control, a display parameter of the target prompt mark in the graphical user interface is adjusted, and the target prompt mark is displayed according to the adjusted display parameter. In this way, after the player selects a certain prompt mark, the first function control of the prompt mark is displayed in the graphical user interface, and the display parameter of the prompt mark in the graphical user interface can be adjusted by triggering the first function control, so that it is convenient for the player to provide feedback on the selected prompt mark and the display of the mark can be adjusted based on the player's feedback, thus improving the player's gaming experience feeling.

An embodiment of the present disclosure further provides another method for processing information, which is implemented based on the foregoing embodiment, and the method focuses on the specific process of determining the target prompt mark in at least one prompt mark according to a selection instruction (which can be specifically implemented through the following steps S202-S204). As shown in FIG. 2, the method includes the following specific steps.

In step S202, in response to an adjustment operation of the game view screen, the first game view screen is controlled to be adjusted to a second game view screen.

The first game view screen is a screen determined by the virtual camera according to the first camera parameter, and the first camera parameter is determined according to a view angle in the current game scene. The adjustment operation of the game view screen may be an operation of adjusting the movement or orientation of the first virtual object in the game scene. Specifically, the step S202 may be implemented by at least one of the following two manners.

In the first manner, a first touch operation acting on a movement control region is detected, the first virtual object is controlled to move in the game scene according to the first touch operation, and the first game view screen is controlled to be adjusted to the second game view screen.

In the second manner, a second touch operation acting on a visual control region is detected, and the first game view screen is controlled to be adjusted to the second game view screen.

In some embodiments, the graphical user interface generally provides with a movement control region and a view control region, etc. Among them, the movement control region and the view control region are independent of each other, and the two regions may be displayed on the graphical user interface all the time, or may be displayed on the graphical user interface according to triggering of a specific condition. The movement control region and the view control region may be provided simultaneously in the graphical user interface, or may be provided separately in the graphical user interface, which is not specifically limited here. The movement control region displays with an identification of a movement control control, that is, a corresponding region of the movement control region to the movement control control, and the movement control region may be larger than the area of the movement control control, for example, the left half screen is full of a movement control region, but the movement control control displayed in the region is only one point. The movement control control may be a virtual remote rod or a direction control virtual key, etc.

The view control region may be any blank region capable of triggering adjustment of a view or a region corresponding to a control in a graphical user interface, for example, a conventional view adjustment region (e.g., a right half screen), or a view screen adjusted when dragging a small eye, or a view screen adjusted by dragging a mirror-opening control after opening the mirror.

The player can control the movement of the first virtual object in the game scene by manipulating the movement control region, that is, controlling the movement direction of the first virtual object in the game scene, so that the position of the first virtual object in the game scene changes, or controlling the movement direction and movement speed of the first virtual object in the game scene, so that the position of the first virtual object in the game scene changes at the movement speed, and meanwhile, the first game view screen displayed in the graphical user interface will be adjusted to a corresponding second game view screen according to the movement of the first virtual object. That is, the second game view screen matches with the game screen corresponding to the movement of the first virtual object.

The player can adjust the first game view screen in the graphical user interface to the second game view screen by manipulating the view control region, that is, the second game view screen is a game screen matched with the adjusted view control region.

In step S204, the target prompt mark in the at least one prompt mark is determined according to a preset position of the second game view screen.

The preset position of the second game view screen may be set according to research and development requirements. For example, the preset position may be the center position of the second game view screen, or may be any position in the second game view screen set according to the research and development requirements.

In some embodiments, an aiming identification is superimposed and displayed in the second game view screen, and the preset position of the second game view screen is the position of the aiming identification. The position of the aiming identification may be set according to it) the research and development requirements, for example, may be the center position of the second game view screen, or may be any position in the second game view screen set according to the research and development requirements.

In some embodiments, the step S204 may also be implemented in the following manner: when it is detected that the preset position of the second game view screen directs to a specified region, the prompt mark corresponding to the specified region is determined as the target prompt mark. The terminal device may detect, in real time, a position region directed by the preset position of the first game view screen. When it is detected that the preset position directs to the specified region, the prompt mark corresponding to the specified region is determined as the target prompt mark, and a first function control for the target prompt mark is displayed in the graphical user interface. There is a corresponding prompt mark in the specified region, and the specified region may be the position of a mark point corresponding to the prompt mark, or may be a certain range centered around the mark point corresponding to the prompt mark.

Figure 3:
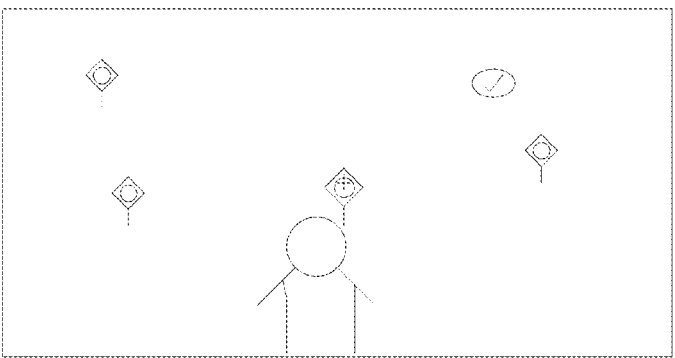
FIG. 3 is a schematic diagram of a first function control according to an embodiment of the present disclosure.

As shown in FIG. 3, a schematic diagram of a first function control is provided. The icon of a diamond shape with a circular in FIG. 3 is represented as a prompt mark displayed in the graphical user interface. The cross at the middle position of FIG. 3 may represent a preset position of a second game view screen, and the prompt mark directed by the preset position (i.e., the prompt mark located in the center of FIG. 3) is a target prompt mark. In FIG. 3, the oval shape marked with "J" is a first function control corresponding to the target prompt mark, and the first function control may be used to confirm the target prompt mark.

In step S206, a first function control corresponding to the target prompt mark is displayed through the graphical user interface.

In step S208, in response to a first trigger operation for the first function control, text information that the first virtual object confirms the target prompt mark is sent in a preset dialog box, the display parameter of the target prompt mark in the graphical user interface is adjusted, and the target prompt mark is displayed according to the adjusted display parameter.

When the player performs the first trigger operation on the first function control, text information that the first virtual object confirms the target prompt mark may be sent in the preset dialog box of the graphical user interface, and the content of the text information may be determined for the content marked by the prompt mark, or may be set as fixed content. For example, the content of the text information may be that the first virtual object responded to the prompt mark. When the text information is sent, the display parameter of the target prompt mark in the graphical user interface needs also to be adjusted, so as to display the target prompt mark in the graphical user interface according to the adjusted display parameter, thus prompting the player more strikingly.

According to the method for processing information, after the player selects a certain prompt mark, the first function control of the prompt mark can be displayed in the graphical user interface, and the display parameter of the prompt mark in the graphical user interface can be adjusted by the player triggering the first function control, so that it is convenient for the player to provide feedback on the selected prompt mark and the display of the mark can be adjusted based on the player's feedback, thus improving the player's gaming experience feeling.

In practical applications, the prompt mark marked by a teammate may be useless to the player. For example, the teammate marks at a certain position in the game scene that there is submachine gun bullet here. However, the two guns owned by the teammate are rifles, the submachine gun bullet is useless to the teammate, and the prompt mark is useless information for the teammate. Displaying useless information may interfere the teammate to participate in the game, and especially when the useless information reaches a certain number, the sight of the teammate can be influenced, so that the teammate cannot see the enemy clearly, thus influencing the game score and the gaming experience. Therefore, the embodiment of the present disclosure further provides another method for processing information, which is implemented on the basis of the above-mentioned embodiment, and the method focuses on the specific process that after the player triggers the first function control, the display parameter of the target prompt mark in the graphical user interface is adjusted, and the target prompt mark is displayed according to the adjusted display parameter, and after the player selects the target prompt mark again, the target prompt mark may be cancelled. As shown in FIG. 4, the method includes the following specific steps.

In step S402, a target prompt mark in at least one prompt mark displayed in the graphical user interface is determined according to a selection instruction.

In step S404, a first function control corresponding to the target prompt mark is displayed through the graphical user interface.

In step S406, in response to a first trigger operation for the first function control, a display parameter of the target prompt mark in the graphical user interface is adjusted, and the target prompt mark is displayed according to the adjusted display parameter.

In step S408, in response to a selection operation for the target prompt mark, a second function control corresponding to the target prompt mark is displayed through the graphical user interface.

Figure 5:
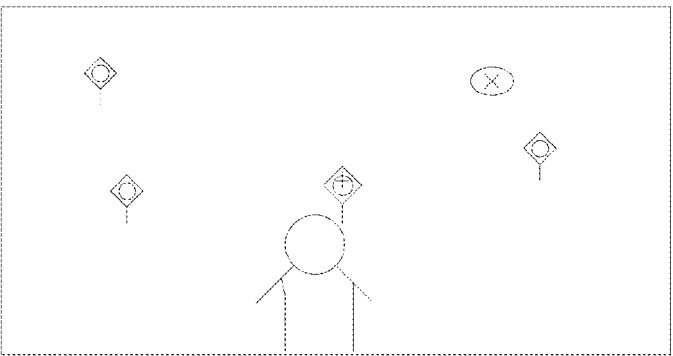
FIG. 5 is a schematic diagram of a second function control according to an embodiment of the present disclosure.

In the process of the game, if the player selects the target prompt mark again after the display parameter is adjusted, the second function control corresponding to the target prompt mark can be displayed in the graphical user interface. The function of the second function control is different from that of the first function control. The first function control is mainly used for the player to determine the target prompt mark, and the second function control is used for a cancelling operation on the target prompt mark. As shown in FIG. 5, a schematic diagram of a second function control is provided. The icon of a diamond shape with a circular in FIG. 5 is represented as a prompt mark displayed in the graphical user interface. The cross at the middle position of FIG. 5 may represent a preset position of a second game view screen, and the prompt mark directed by the preset position (i.e., the prompt mark located in the center of FIG. 5) is a target prompt mark. In FIG. 5, the oval shape marked with "X" is a second function control corresponding to the target prompt mark, and the second function control may be used to cancel the target prompt mark.

In some embodiments, the selection operation for the target prompt mark is implemented through the adjustment operation of the game view screen, and the target prompt mark is determined according to the adjustment operation, and the specific process of selecting the target prompt mark may refer to the above steps S202-S204, which will not be repeated here.

In step S410, in response to a first trigger operation for the second function control, display of the target prompt mark is canceled in the graphical user interface corresponding to the first virtual object, and the text information that the first virtual object cancels display of the target prompt mark is sent.

The first trigger operation for the second function control may be a click operation or a sliding operation or the like for the second function control. When the player triggers the second function control, the target prompt mark is no longer displayed in the graphical user interface corresponding to the first virtual object controlled by the player, and the text information that the first virtual object cancels display of the target prompt mark is sent in the preset dialog box of the graphical user interface. The target prompt mark is no longer displayed in the graphical user interface, indicating that the target prompt mark is useless for the player, and canceling the display may increase the operation space of the player. The text information that the first virtual object cancels display of the target prompt mark sent in the preset dialog box may be set according to the research and development requirements. Usually different kinds of text information can be sent for different types marked by the target prompt mark. For example, if that marked by the target prompt mark is a virtual vehicle, a virtual material, an airdrop or a virtual box, the text information being sent is that I do not need XXXX (a corresponding specific article); and if that marked by the target prompt mark is a certain specific virtual scene, the text information being sent is that the exception is not found temporarily.

In some embodiments, in response to a first trigger operation for the second function control, display of the second function control is canceled in the graphical user interface. That is, after the player triggers the second function control, the second function control disappears in the graphical user interface.

In some embodiments, in response to a first trigger operation for the second function control, in the graphical user interface corresponding to the first virtual object, display of mark information associated with the target prompt mark and included in the display game scene is canceled within a specified time period. The specified time period may be set according to research and development requirements, for example, may be set to 1 minute or 5 minutes, etc.

The player triggers the second function control corresponding to the target prompt mark, indicating that the information marked by the target prompt mark is useless information for the player. Therefore, in order to reduce the interference of useless information to the player, after the player triggers the second function control, not only can display of the target prompt mark be canceled, but also the mark information same to or matched with the target prompt mark and included in the graphical user interface can be searched, and display of the prompt mark corresponding to the found mark information is canceled within the specified time period, so that the information display is screened, the mark with a high probability of being useless information is not transmitted to the player, and interference is reduced.

In some embodiments, the virtual vehicle, the airdrop and the virtual box are usually all a same certain model. For example, a teammate (equivalent to the second virtual object) marks the A vehicle, the player triggers the second function control to cancel the mark, then the teammate marks the B vehicle, the mark corresponding to the B vehicle is displayed; and if the teammate marks the A vehicle again, and then the mark corresponding to the A vehicle is not displayed within a specified time period. The virtual material is a same specific type of material. For example, the player cancels the prompt mark of the submachine gun bullet, and then the prompt marks of all teammates to the submachine gun bullet are all not displayed to the player within the specified time period. The specific virtual scene mark is within a certain region, for example, the teammate marks a coordinate (500, 500) as a prompt mark, the player cancels it, and then any prompt mark marked by another teammate near the coordinate (500, 500) is not displayed to the player.

According to the method for processing information, after the player triggers the first function control, the display parameter of the target prompt mark in the graphical user interface is adjusted, and the target prompt mark is displayed according to the adjusted display parameter, and after the player selects the target prompt mark again, the second function control can be displayed in the graphical user interface. The player triggers the second function control, so that the display of the target prompt mark can be canceled in the graphical user interface, and the text information that the first virtual object cancels display of the target prompt mark is sent. Among them, the prompt mark canceled by the player is a useless mark. Cancelling display of the useless mark can increase the operation space of the player in the graphical user interface, and reduce the interference of the useless mark on the player, thus improving the player's game score and gaming experience.

In order to avoid the interference of the useless mark on the player, the embodiment of the present disclosure further provides another method for processing information, which is implemented on the basis of the above-mentioned embodiments, and the method focuses on a specific process (specifically implemented by step S606) that when the first function control has two functions of a confirmation function and a cancel function, feedback on the target prompt mark is cancelled. As shown in FIG. 6, the method includes the following specific steps.

In step S602, a target prompt mark in at least one prompt mark displayed in the graphical user interface is determined according to the selection instruction.

In step S604, a first function control corresponding to the target prompt mark is displayed through the graphical user interface.

Figure 7:
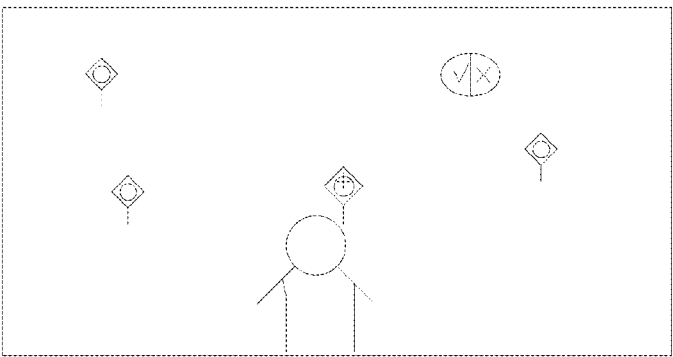
FIG. 7 is a schematic diagram of another first function control according to an embodiment of the present disclosure.

In some embodiments, the first function control may be provided with two functions, that is, a confirmation function and a cancel function. The two functions respectively correspond to two buttons in the first function control. As shown in FIG. 7, another schematic diagram of the first function control is provided. The prompt mark directed by the cross at the middle position of FIG. 7 (i.e., the prompt mark located in the center of FIG. 7) is a target prompt mark. In FIG. 7, the oval shape marked with "J" and "X" is the first function control corresponding to the target prompt mark. The region with "J" of the first function control is a button corresponding to the confirmation function, and the region with "X" is a button corresponding to the cancel function. When the player triggers the button corresponding to the confirmation function (equivalent to performing the first trigger operation on the first function control), the display parameter of the target prompt mark in the graphical user interface is adjusted, the target prompt mark is displayed according to the adjusted display parameter, and the text information that the first virtual object confirms the target prompt mark is sent in a preset dialog box.

In step S606, in response to a second trigger operation for the first function control, display of the target prompt mark is canceled in the graphical user interface corresponding to the first virtual object, and the text information that the first virtual object cancels display of the target prompt mark is sent.

When the player triggers the button corresponding to the cancel function in the first function control (equivalent to a second trigger operation for the first function control), display of the target prompt mark is canceled in the graphical user interface, and the text information that the first virtual object cancels display of the target prompt mark is sent. Canceling display of the target prompt mark in the graphical user interface indicates that the target prompt mark is a useless mark for the player, and cancelling the display may increase the operation space of the player. The text information that the first virtual object cancels display of the target prompt mark sent in the preset dialog box may be set according to the research and development requirements. Generally, different text information may be sent for different types marked by the target prompt mark.

In some embodiments, in response to a second trigger operation for the first function control, in a graphical user interface corresponding to the first virtual object, mark information associated with the target prompt mark and included in the display game scene is canceled within a specified time period.

The player triggers the cancel function of the first function control corresponding to the target prompt mark, indicating that the information marked by the target prompt mark is useless information for the player. Therefore, in order to reduce the interference of useless information to the player, after the player triggers the cancel function, not only can display of the target prompt mark be canceled, but also the mark information same to or matched with the target prompt mark included in the graphical user interface can be searched, and display of the prompt mark corresponding to the found mark information is canceled within the specified time period, so that the information display is screened, the mark with a high probability of being useless information is not transmitted to the player, and interference is reduced.

In some embodiments, the target prompt mark includes a mark of a target position point in the game scene. In response to a second trigger operation for the first function control, display of the mark information marked at the target position point in the display game scene is canceled within the specified time period. For example, the teammate marks the target position point (500, 500) as a prompt mark, the player triggers the cancel function of the first function control, and at this time, any prompt mark marked near the target position point (500, 500) by another teammate is not displayed to the player.

In some embodiments, display of the first function control is canceled in response to a second trigger operation for the first function control. That is, after the player triggers the first function control, the first function control disappears in the graphical user interface.

According to the method for processing information, a target prompt mark in at least one prompt mark displayed in a graphical user interface is determined according to a selection instruction; and a first function control corresponding to the target prompt mark is displayed through the graphical user interface; and then, in response to a second trigger operation for the first function control, display of the target prompt mark is cancelled in the graphical user interface corresponding to the first virtual object, and the text information that the first virtual object cancels display of the target prompt mark is sent. In this way, the player can cancel display of a certain prompt mark through the cancel function provided by the first function control, so that the operation space of the player in the graphical user interface can be increased, and the interference of some useless marks on the player is reduced, thus improving of the player's game score and gaming experience.

Figure 8:
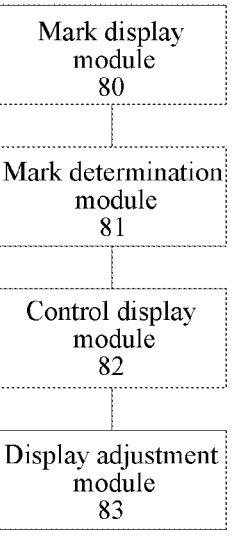
FIG. 8 is a schematic structural diagram of an apparatus for processing information according to an embodiment of the present disclosure.

Corresponding to the foregoing method embodiments, an embodiment of the present disclosure provides an apparatus for processing information. A graphical user interface is provided through a terminal device, and the graphical user interface includes a first game view screen, where the first game view screen at least partially includes a game scene and at least partially includes a first virtual object. As shown in FIG. 8, the apparatus includes:

a mark display module 80, configured to perform displaying at least one prompt mark through the graphical user interface, where the prompt mark is a mark generated according to a marking operation of a second virtual object in a same game round as the first virtual object in the game scene;

a mark determination module 81, configured to perform determining a target prompt mark in the at least one prompt mark according to a selection instruction;

a control display module 82, configured to perform displaying a first function control corresponding to the target prompt mark through the graphical user interface;

a display adjustment module 83, configured to perform adjusting a display parameter of the target prompt mark in the graphical user interface in response to a first trigger operation for the first function control and displaying the target prompt mark according to the adjusted display parameter.

According to the apparatus for processing information, firstly, at least one prompt mark is displayed through a graphical user interface, the prompt mark is a mark generated according to a marking operation of a second virtual object in a same game round as the first virtual object in the game scene; and a target prompt mark in the at least one prompt mark is determined according to a selection instruction; then, a first function control corresponding to the target prompt mark is displayed through the graphical user interface; and then, in response to a first trigger operation for the first function control, a display parameter of the target prompt mark in the graphical user interface is adjusted, and the target prompt mark is displayed according to the adjusted display parameter. In this way, after the player selects a certain prompt mark, a first function control of the prompt mark is displayed in the graphical user interface, and the display parameter of the prompt mark in the graphical user interface can be adjusted by triggering the first function control, so that it is convenient for the player to provide feedback on the selected prompt mark and the display of the mark can be adjusted based on the player's feedback, thus improving the player's gaming experience feeling.

In some embodiments, the first game view screen is a screen determined by the virtual camera according to a first camera parameter. The mark determination module 81 is configured to perform: in response to an adjustment operation of a game view screen, controlling to adjust the first game view screen to a second game view screen; and determining the target prompt mark in the at least one prompt mark according to a preset position of the second game view screen.

Further, the mark determination module 81 is further configured to perform: when it is detected that the preset position of the second game view screen directs to a specified region, determining a prompt mark corresponding to the specified region as the target prompt mark.

In some embodiments, an aiming identification is superimposed and displayed in the second game view screen, and the preset position of the second game view screen is the position of the aiming identification.

In some embodiments, in response to the adjustment operation of the game view screen, the manner of controlling to adjust the first game view screen to the second game view screen includes at least one of the following:

detecting a first touch operation acting on a movement control region, controlling the first virtual object to move in the game scene according to the first touch operation, and controlling to adjust the first game view screen to the second game view screen; and, detecting a second touch operation acting on a view control region and controlling to adjust the first game view screen to the second game view screen.

In some embodiments, the display parameter includes a display duration and/or a display style, where the display style includes a display color and/or a display size.

Further, the apparatus further includes a first cancellation module configured to perform: in response to a first trigger operation for the first function control, adjusting the display parameter of the target prompt mark in the graphical user interface; after displaying the target prompt mark according to the adjusted display parameter, in response to a selection operation for the target prompt mark, displaying a second function control corresponding to the target prompt mark through the graphical user interface; in response to a first trigger operation for the second function control, canceling display of the target prompt mark in the graphical user interface corresponding to the first virtual object, and sending text information that the first virtual object cancels display of the target prompt mark.

Further, the first cancellation module is further configured to perform: in response to a first trigger operation for the second function control, in a graphical user interface corresponding to the first virtual object, cancelling display of mark information associated with the target prompt mark and included in the display game scene within a specified time period.

Further, the apparatus further includes a second cancellation module configured to perform: after displaying the first function control corresponding to the target prompt mark through the graphical user interface, in response to a second trigger operation for the first function control, cancelling the display of the target prompt mark in the graphical user interface corresponding to the first virtual object, and sending text information that the first virtual object cancels display of the target prompt mark.

Further, the second cancellation module is further configured to perform: in response to a second trigger operation for the first function control, in a graphical user interface corresponding to the first virtual object, cancelling display of mark information associated with the target prompt mark and included in the display game scene within a specified time period.

In some embodiments, the target prompt mark includes a mark of a target position point in the game scene; and the second cancellation module is further configured to perform: in response to a second trigger operation for the first function control, cancelling display of mark information marked at the target position point in the display game scene within the specified time period.

Further, the apparatus further includes a control cancellation module configured to perform: in response to a second trigger operation for the first function control, cancelling display of the first function control.

Further, the apparatus further includes an information sending module configured to perform: in response to a first trigger operation for the first function control, sending text information that the first virtual object confirms the target prompt mark in a preset dialog box.

The apparatus for processing information provided by the embodiments of the present disclosure has the same implementation principles and generated technical effects as the foregoing embodiments of method for processing information. For brief description, any aspects not mentioned in the apparatus embodiments can be referred to the corresponding content of the foregoing method embodiments.

Figure 9:
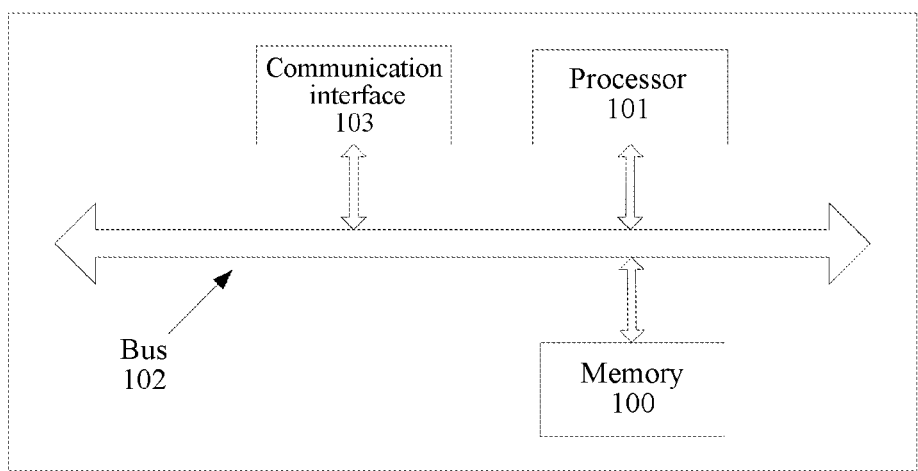
FIG. 9 is a schematic structural diagram of a terminal device according to an embodiment of the present disclosure.

An embodiment of the present disclosure provides a terminal device. As shown in FIG. 9, the terminal device includes a processor 101 and a memory 100, the memory 100 stores with a machine-executable instructions executable by the processor 101, and the processor 101 executes the machine-executable instruction to implement the following method steps:

displaying at least one prompt mark through the graphical user interface, where the prompt mark is a mark generated according to a marking operation of a second virtual object in a same game round as the first virtual object in the game scene; determining a target prompt mark in the at least one prompt mark according to a selection instruction; displaying a first function control corresponding to the target prompt mark through the graphical user interface; and in response to a first trigger operation for the first function control, adjusting a display parameter of the target prompt mark in the graphical user interface, and displaying the target prompt mark according to the adjusted display parameter.

In some embodiments, the step of determining the target prompt mark in the at least one prompt mark according to the selection instruction includes: in response to an adjustment operation of a game view screen, controlling to adjust the first game view screen to a second game view screen; and determining the target prompt mark in the at least one prompt mark according to a preset position of the second game view screen.

In some embodiments, the step of determining the target prompt mark in the at least one prompt mark according to the preset position of the second game view screen includes: when it is detected that the preset position of the second game view screen directs to a specified region, determining a prompt mark corresponding to the specified region as the target prompt mark.

In some embodiments, an aiming identification is superimposed and displayed in the second game view screen, and the preset position of the second game view screen is a position of the aiming identification.

In some embodiments, the step of controlling to adjust the first game view screen to the second game view screen in response to the adjustment operation of the game view screen includes at least one of following: detecting a first touch operation acting on a movement control region, controlling the first virtual object to move in the game scene according to the first touch operation, and controlling to adjust the first game view screen to the second game view screen; and detecting a second touch operation acting on a view control region, and controlling to adjust the first game view screen to the second game view screen.

In some embodiments, the display parameter includes a display duration and/or a display style, where the display style includes a display color and/or a display size.

In some embodiments, after the step of in response to the first trigger operation for the first function control, adjusting the display parameter of the target prompt mark in the graphical user interface and displaying the target prompt mark according to the adjusted display parameter, the method further includes: in response to a selection operation for the target prompt mark, displaying a second function control corresponding to the target prompt mark through the graphical user interface; in response to a first trigger operation for the second function control, canceling display of the target prompt mark in a graphical user interface corresponding to the first virtual object, and sending text information that the first virtual object cancels display of the target prompt mark.

In some embodiments, the method further includes: in response to a first trigger operation for the second function control, in the graphical user interface corresponding to the first virtual object, canceling display of mark information associated with the target prompt mark and included in the display game scene within a specified time period.

In some embodiments, after the step of displaying the first function control corresponding to the target prompt mark through the graphical user interface, the method further includes: in response to a second trigger operation for the first function control, canceling display of the target prompt mark in a graphical user interface corresponding to the first virtual object, and sending text information that the first virtual object cancels the display of the target prompt mark.

In some embodiments, the method further includes: in response to a second trigger operation for the first function control, in a graphical user interface corresponding to the first virtual object, canceling display of mark information associated with the target prompt mark and included in the display game scene within a specified time period.

In some embodiments, the target prompt mark includes a mark of a target position point in the game scene; and the step of canceling display of the mark information associated with the target prompt mark and included in the display game scene within the specified time period includes: canceling display of mark information marked at the target position point in the display game scene within the specified time period.

In some embodiments, the method further includes: in response to a second trigger operation for the first function control, canceling display of the first function control.

In some embodiments, the method further includes: in response to a first trigger operation for the first function control, sending text information that the first virtual object confirms the target prompt mark in a preset dialog box.

Specific implementations of the embodiments of the present disclosure are similar to those of the method embodiments, which are not described here again.

According to the embodiments of the present disclosure, after a player selects a certain prompt mark, a first function control of the prompt mark can be displayed in the graphical user interface, and the display parameter of the prompt mark in the graphical user interface can be adjusted by the player triggering the first function control, so that it is convenient for the player to provide feedback on the selected prompt mark and the display of the mark can be adjusted based on the player's feedback, thus improving the player's gaming experience feeling. Further, the terminal device shown in FIG. 9 further includes a bus 102 and a communication interface 103, and the processor 101, the communication interface 103, and the memory 100 are connected through the bus 102.

Among them, the memory 100 may include a high-speed random access memory (RAM), or may further include a non-volatile memory, such as at least one magnetic disk memory. The communication connection between the system network element and at least one other network element may be implemented through the at least one communication interface 103 (which may be wired or wireless), and the Internet, a wide region network, a local network, a metropolitan region network, and the like may be used. The bus 102 may be an ISA bus, a PCI bus, or an EISA bus, or the like. The bus may be divided into an address bus, a data bus, a control bus, and the like. For ease of representation, only one bidirectional arrow is used in FIG. 9 to represent the bus, but it does not mean that there is only one bus or one type of bus.

The processor 101 may be an integrated circuit chip having a signal processing capability. In an implementation process, each step of the foregoing method may be completed by an integrated logic circuit of hardware or an instruction in the form of software in the processor 101. The processor 101 may be a general-purpose processor, including a central processing unit (CPU), a network processor (NP), or the like, or may be a digital signal processor (DSP), an application specific integrated circuit (ASIC), a field-programmable gate array (FPGA) or another programmable logic device, a discrete gate or a transistor logic device, and a discrete hardware component. Each method, step, and logic block diagram disclosed in the embodiments of the present disclosure may be implemented or performed. The general-purpose processor may be a microprocessor or the processor may be any conventional processor or the like. The steps of the method disclosed in connection with the embodiments of the present disclosure may be directly embodied as being performed and completed by a hardware decoding processor, or being performed and completed by a combination of hardware software modules in a decoding processor. The software module may be located in a mature storage medium in the art, such as a random access memory, a flash memory, a read-only memory, a programmable read-only memory or an electrically erasable programmable memory, a register, etc. The storage medium is located in the memory 100, and the processor 101 reads information in the memory 100, and in combination with its hardware, completes the steps of the method according to the foregoing embodiments.

An embodiment of the present disclosure further provides a computer-readable storage medium, where the computer-readable storage medium stores with a computer-executable instruction, and when the computer-executable instruction is invoked and executed by a processor, the computer-executable instruction causes the processor to implement the following method steps:

displaying at least one prompt mark through the graphical user interface, where the prompt mark is a mark generated according to a marking operation of a second virtual object in a same game round as the first virtual object in the game scene; determining a target prompt mark in the at least one prompt mark according to a selection instruction; displaying a first function control corresponding to the target prompt mark through the graphical user interface; and in response to a first trigger operation for the first function control, adjusting a display parameter of the target prompt mark in the graphical user interface, and displaying the target prompt mark according to the adjusted display parameter.

In some embodiments, the step of determining the target prompt mark in the at least one prompt mark according to the selection instruction includes: in response to an adjustment operation of a game view screen, controlling to adjust the first game view screen to a second game view screen; and determining the target prompt mark in the at least one prompt mark according to a preset position of the second game view screen.

In some embodiments, the step of determining the target prompt mark in the at least one prompt mark according to the preset position of the second game view screen includes: when it is detected that the preset position of the second game view screen directs to a specified region, determining a prompt mark corresponding to the specified region as the target prompt mark.

In some embodiments, an aiming identification is superimposed and displayed in the second game view screen, and the preset position of the second game view screen is a position of the aiming identification.

In some embodiments, the step of controlling to adjust the first game view screen to the second game view screen in response to the adjustment operation of the game view screen includes at least one of following: detecting a first touch operation acting on a movement control region, controlling the first virtual object to move in the game scene according to the first touch operation, and controlling to adjust the first game view screen to the second game view screen; and detecting a second touch operation acting on a view control region, and controlling to adjust the first game view screen to the second game view screen.

In some embodiments, the display parameter includes a display duration and/or a display style, where the display style includes a display color and/or a display size.

In some embodiments, after the step of in response to the first trigger operation for the first function control, adjusting the display parameter of the target prompt mark in the graphical user interface and displaying the target prompt mark according to the adjusted display parameter, the method further includes: in response to a selection operation for the target prompt mark, displaying a second function control corresponding to the target prompt mark through the graphical user interface; in response to a first trigger operation for the second function control, canceling display of the target prompt mark in a graphical user interface corresponding to the first virtual object, and sending text information that the first virtual object cancels display of the target prompt mark.

In some embodiments, the method further includes: in response to a first trigger operation for the second function control, in the graphical user interface corresponding to the first virtual object, canceling display of mark information associated with the target prompt mark and included in the display game scene within a specified time period.

In some embodiments, after the step of displaying the first function control corresponding to the target prompt mark through the graphical user interface, the method further includes: in response to a second trigger operation for the first function control, canceling display of the target prompt mark in a graphical user interface corresponding to the first virtual object, and sending text information that the first virtual object cancels the display of the target prompt mark.

In some embodiments, the method further includes: in response to a second trigger operation for the first function control, in a graphical user interface corresponding to the first virtual object, canceling display of mark information associated with the target prompt mark and included in the display game scene within a specified time period.

In some embodiments, the target prompt mark includes a mark of a target position point in the game scene; and the step of canceling display of the mark information associated with the target prompt mark and included in the display game scene within the specified time period includes: canceling display of mark information marked at the target position point in the display game scene within the specified time period.

In some embodiments, the method further includes: in response to a second trigger operation for the first function control, canceling display of the first function control.

In some embodiments, the method further includes: in response to a first trigger operation for the first function control, sending text information that the first virtual object confirms the target prompt mark in a preset dialog box.

For specific implementation, reference may be made to the method embodiments, which are not described here again.

According to the embodiments of the present disclosure, after a player selects a certain prompt mark, a first function control of the prompt mark can be displayed in the graphical user interface, and the display parameter of the prompt mark in the graphical user interface can be adjusted by the player triggering the first function control, so that it is convenient for the player to provide feedback on the selected prompt mark and the display of the mark can be adjusted based on the player's feedback, thus improving the player's gaming experience feeling.

When the functions are implemented in the form of a software functional unit and sold or used as an independent product, the functions may be stored in a computer-readable storage medium. Based on such understanding, the technical solution of the present disclosure, in essence, or the portion that contributes to related art or the portion of the technical solution, may be embodied in the form of a software product, and the computer software product is stored in a storage medium, which includes several instructions for enabling a computer device (which may be a personal computer, a terminal device, or a network device, etc.) to perform all or part of the steps of the method according to various embodiments of the present disclosure. The foregoing storage medium includes various medium that can store program codes, such as a USB flash disk, a mobile hard disk, a read-only memory (ROM), a random access memory (RAM), a magnetic disk, or an optical disc.

In the description of the present disclosure, it should be noted that the orientation or positional relationship indicated by the terms "center," "upper," "lower," "left," "right," "vertical," "horizontal," "inner," "outer," and the like is based on the orientation or positional relationship shown in the drawings, just for the convenience of describing the present disclosure and simplifying the description, rather than indicating or implying that the indicated apparatus or element must have a specific orientation, or be constructed and operated in a specific orientation, and therefore cannot be understood as a limitation to the present disclosure. In addition, the terms "first", "second" and "third" are used for purposes of description only and cannot be understood as indicating or implying relative importance.

Finally, it should be noted that, the above embodiments are merely specific embodiments of the present disclosure, and are used to illustrate the technical solutions of the present disclosure without limitation, and the protection scope of the present disclosure is not limited to this. Although the present disclosure is described in detail with reference to the foregoing embodiments, those of ordinary skills in the art should understand that, any person skilled in the art familiar with the technical field can still modify or easily think of changes to the technical solutions recorded in the forgoing embodiments, or make equivalent substitutions of some of the technical features in the technical solutions, within the technology scope disclosed by the present disclosure. And these modifications, changes, or substitutions do not separate the essence of the corresponding technical solutions from the spirit and scope of the technical solution of embodiments in the present disclosure, and should be covered within the protection scope of the present disclosure. Therefore, the protection scope of the present disclosure shall be subject to the protection scope of the claims.

What is claimed is:

1. A method for processing information, comprising:
   displaying, by a terminal device comprising a graphical user interface, at least one prompt mark through the graphical user interface, wherein the graphical user interface comprises a first game view screen, the first game view screen at least partially comprises a game scene and at least partially comprises a first virtual object, and the prompt mark is a mark generated according to a marking operation of a second virtual object in a same game round as the first virtual object in the game scene;

determining a target prompt mark in the at least one prompt mark according to a selection instruction;

displaying a first function control corresponding to the target prompt mark through the graphical user interface; and in response to a first trigger operation for the first function control, adjusting a display parameter of the target prompt mark in the graphical user interface and displaying the target prompt mark according to the display parameter.

2. The method according to claim 1, wherein determining the target prompt mark in the at least one prompt mark according to the selection instruction comprises:

in response to an adjustment operation of a game view screen, adjusting the first game view screen to a second game view screen; and determining the target prompt mark in the at least one prompt mark according to a preset position of the second game view screen.

3. The method according to claim 2, wherein determining the target prompt mark in the at least one prompt mark according to the preset position of the second game view screen comprises:

in response to detecting that the preset position of the second game view screen directs to a specified region, determining a prompt mark corresponding to the specified region as the target prompt mark.

4. The method according to claim 2, wherein an aiming identification is superimposed and displayed in the second game view screen, and the preset position of the second game view screen is a position of the aiming identification.

5. The method according to claim 2, wherein in response to the adjustment operation of the game view screen, adjusting the first game view screen to the second game view screen comprises at least one of following:

detecting a first touch operation acting on a movement control region, controlling the first virtual object to move in the game scene according to the first touch operation, and adjusting the first game view screen to the second game view screen; or detecting a second touch operation acting on a view control region, and adjusting the first game view screen to the second game view screen.

6. The method according to claim 2, wherein determining the target prompt mark in the at least one prompt mark according to the preset position of the second game view screen comprises:

in response to detecting that the preset position of the second game view screen aims at a prompt mark, determining the prompt mark as the target prompt mark.

7. The method according to claim 1, wherein the display parameter comprises a display duration and/or a display style; wherein the display style includes a display color and/or a display size.

8. The method according to claim 1, wherein, the method further comprises:

in response to a selection operation for the target prompt mark, displaying a second function control corresponding to the target prompt mark through the graphical user interface; and in response to a first trigger operation for the second function control, canceling display of the target prompt mark in a graphical user interface corresponding to the first virtual object, and sending text information that the first virtual object cancels the display of the target prompt mark.

9. The method according to claim 8, wherein the method further comprises:

in response to the first trigger operation for the second function control, in the graphical user interface corresponding to the first virtual object, canceling display of mark information associated with the target prompt mark and comprised in the game scene within a specified time period.

10. The method according to claim 9, wherein the target prompt mark comprises a mark of a target position point in the game scene; and canceling the display of the mark information associated with the target prompt mark and comprised in the game scene within the specified time period comprises:

cancelling display of mark information marked at the target position point in the game scene within the specified time period.

11. The method according to claim 1, wherein the method further comprises:

in response to a second trigger operation for the first function control, cancelling display of the target prompt mark in a graphical user interface corresponding to the first virtual object, and sending text information that the first virtual object cancels the display of the target prompt mark.

12. The method according to claim 11, wherein the method further comprises:

in response to the second trigger operation for the first function control, in the graphical user interface corresponding to the first virtual object, canceling display of mark information associated with the target prompt mark and comprised in the game scene within a specified time period.

13. The method of claim 11, wherein the method further comprises:

in response to the second trigger operation for the first function control, canceling display of the first function control.

14. The method according to claim 11, wherein the first function control is provided with a first button corresponding to a confirmation function and a second button corresponding to a cancel function.

15. The method according to claim 14, wherein the first trigger operation for the first function control comprises a trigger operation for the first button.

16. The method according to claim 14, wherein the second trigger operation for the first function control comprises a trigger operation for the second button.

17. The method according to claim 1, wherein the method further comprises:

in response to a first trigger operation for the first function control, sending text information that the first virtual object confirms the target prompt mark in a preset dialog box.

18. The method according to claim 1, wherein the first trigger operation for the first function control comprises at least one of following:

a click operation for the first function control;
a sliding operation for the first function control;
a click operation for a specified region of the first function control; or
a sliding operation for a specified region of the first function control.

19. A terminal device, comprising a processor and a memory, wherein the memory stores with a machine-executable instruction able to be executed by the processor, and the processor executes the machine-executable instruction to implement a method for processing information, comprising:

displaying at least one prompt mark through a graphical user interface of the terminal device, wherein the graphical user interface comprises a first game view screen, the first game view screen at least partially comprises a game scene and at least partially comprises a first virtual object, and the prompt mark is a mark generated according to a marking operation of a second virtual object in a same game round as the first virtual object in the game scene;

determining a target prompt mark in the at least one prompt mark according to a selection instruction;

displaying a first function control corresponding to the target prompt mark through the graphical user interface; and in response to a first trigger operation for the first function control, adjusting a display parameter of the target prompt mark in the graphical user interface and displaying the target prompt mark according to the display parameter.

20. A non-transitory computer-readable storage medium, wherein the computer-readable storage medium stores with a computer-executable instruction, and when the computer-executable instruction is invoked and executed by a processor, the computer-executable instruction causes the processor to implement a method for processing information, comprising:

displaying at least one prompt mark through a graphical user interface, wherein the graphical user interface comprises a first game view screen, the first game view screen at least partially comprises a game scene and at least partially comprises a first virtual object, and the prompt mark is a mark generated according to a marking operation of a second virtual object in a same game round as the first virtual object in the game scene;

determining a target prompt mark in the at least one prompt mark according to a selection instruction;

displaying a first function control corresponding to the target prompt mark through the graphical user interface; and in response to a first trigger operation for the first function control, adjusting a display parameter of the target prompt mark in the graphical user interface and displaying the target prompt mark according to the display parameter.

* * * * *